United States Patent [19]

Pieper et al.

[11] Patent Number: 5,237,940
[45] Date of Patent: Aug. 24, 1993

[54] METHOD AND APPARATUS FOR THE ENVIRONMENTALLY COMPATIBLE VITRIFICATION OF FLUID OR SOLID RESIDUES FROM SPECIAL-CLASS WASTE INCINERATORS

[75] Inventors: Helmut Pieper, Lohr/Main; Helmut Lausberg, Oberhausen, both of Fed. Rep. of Germany

[73] Assignees: Beteiligungen Sorg GmbH & Co. KG, Lohr/Main; Man Gutehollnungshutte AG, Oberhausen, both of Fed. Rep. of Germany

[21] Appl. No.: 861,573

[22] Filed: Apr. 1, 1992

[30] Foreign Application Priority Data

Apr. 13, 1991 [DE] Fed. Rep. of Germany ....... 4112162

[51] Int. Cl.⁵ .............................................. F23G 5/00
[52] U.S. Cl. .......................................... 110/346; 65/19;
110/165 R; 110/165 A; 110/246; 110/259
[58] Field of Search ............... 110/346, 165 R, 165 A,
110/259, 246; 65/136, 19

[56] References Cited

U.S. PATENT DOCUMENTS

| | | | |
|---|---|---|---|
| 4,191,546 | 3/1980 | Kroyer | 65/20 |
| 4,831,943 | 5/1989 | Aune | 110/346 |
| 4,915,039 | 4/1990 | Ringel | 110/346 |
| 4,944,785 | 7/1990 | Sorg et al. | 65/136 |
| 4,948,411 | 8/1990 | Pieper et al. | 65/342 |
| 4,977,837 | 12/1990 | Roos et al. | 110/165 A |
| 5,078,065 | 1/1992 | Tsunemi et al. | 110/165 A X |
| 5,081,940 | 1/1992 | Motomura et al. | 110/259 X |

FOREIGN PATENT DOCUMENTS

| | | |
|---|---|---|
| 0294362 | 12/1988 | European Pat. Off. . |
| 0359003 | 3/1990 | European Pat. Off. . |
| 0417520 | 3/1991 | European Pat. Off. . |
| 0437679 | 7/1991 | European Pat. Off. . |
| 2849166 | 5/1980 | Fed. Rep. of Germany . |
| 3830392 | 3/1990 | Fed. Rep. of Germany . |
| 3904613 | 9/1990 | Fed. Rep. of Germany . |
| 4024273 | 2/1991 | Fed. Rep. of Germany . |

OTHER PUBLICATIONS

VGB-Konferenz "Rückstände Aus der Müllverbrennung" VGB-Kraftwerlestechnik 70 (1990) May No. 5 pp. 428-430.

Primary Examiner—Edward G. Favors
Attorney, Agent, or Firm—Felfe & Lynch

[57] ABSTRACT

Waste is incinerated in a rotary furnace which discharges slag and exhaust gas connected to an afterburning chamber. The slag is discharged from the afterburning chamber directly into a glass melting furnace while the exhaust gas is removed to scrubbers which remove residues which are then fed to the glass melting furnace. Cullet and other glass forming materials are also added to the furnace in order to form a vitrified product.

14 Claims, 4 Drawing Sheets

METHOD AND APPARATUS FOR THE ENVIRONMENTALLY COMPATIBLE VITRIFICATION OF FLUID OR SOLID RESIDUES FROM SPECIAL-CLASS WASTE INCINERATORS

BACKGROUND OF THE INVENTION

The invention relates to a method for the environmentally compatible vitrification of solid or fluid residues from special-class waste incinerators and an apparatus for the practice of the method.

In an incinerator for the disposal of special-class wastes from chemical production which are in the form of contaminated, partially solid and fluid substances, rotary tubular furnaces are charged with these solid and fluid substances in a ratio of approximately 1:1. The ashes from the waste heat boiler and the dusts from the exhaust scrubbing apparatus, which contain newly formed dioxins and/or furans, are put into transport vessels and at the same time moistened with aqueous solutions of surface active substances in order to avoid raising dust when handling them. The ashes and the filter dusts are then mixed together and fed with the solid special-class wastes into the rotary furnace where they are bound in the inorganic matrix of the fluid slag. The glass-like slag is withdrawn through a wet slagger.

This glass-like slag contains both heavy metals and chlorides, carbon and halides. It has to be treated and dumped as special-class waste.

SUMMARY OF THE INVENTION

The invention is addressed to the problem of creating a special-class waste incinerator with which any fluid and solid residues charged with dioxins, furans, heavy metals, salts etc. can be converted to a form which permits an environmentally acceptable reuse or dumping of these wastes.

The invention is advantageously based on the fact that the residues from a rotary furnace are, within the framework of an additional thermal treatment, separated, made thermally inert, and converted to a glass mass which then can be made available for further use.

According to the invention, for this residue after-treatment, in which not only are the solid and fluid slags from the rotary oven vitrified, but also the dioxins and furans contained in the dusts given off by the apparatus connected to the output of the rotary furnace are eliminated, a melting furnace is selected, which is known in itself but is modified for this purpose. This melting furnace is integrated into the known special-class waste incinerator.

In this manner a direct after-treatment of solid and fluid residue products from the rotary furnace, the additional treatment of filter dusts from flue gas scrubbers, the separation and binding of heavy metal components into a vitreous end product, the complete destruction of dioxins and furans, a volume and weight reduction, and thus the production of a more environmentally friendly glass product is made possible, which is suitable for reuse and/or for disposal in normal dumps.

A process for the conversion of solid, largely water-free waste materials from a waste incinerator to a form of glass, and the apparatus for the performance of the process, are disclosed in DE 38 41 889 A1, to which U.S. Pat. No. 4,944,785 corresponds. In this process the wastes in the form of solid, largely water-free trash incinerator ashes are fed to a melting furnace. The crucible, the input electrodes and their feeder lines are described in DE 34 45 557 A1. An additional step in the process for the melting of glass is reported in DE 34 45 548 A1. In DE 28 49 166 A1 an electrically heated melting furnace for mineral substances is proposed whose essential components and process features are in part the same as the furnace of the post-treatment apparatus according to the invention.

In the electrical melting according to the above-mentioned furnace the glass melt serves as a resistance. The current flows through the bath through electrodes immersed in the bath. The conductivity of the molten glass is based on its ion conductivity.

In the present invention, this melting furnace, known in itself, is directly integrated into the special-class waste incinerator. In fact, instead of a wet slagger as used heretofore, it is operated directly in back of the afterburner chamber.

This arrangement furthermore offers the following advantages for the entire installation,
that all solid residues are removed only at one location, the heat content of the fluid slag from the rotary furnace is utilized directly in the after-treatment, and
that the exhaust gases from the melting process are recycled directly into the flue gas of the special-class waste incinerator for cleaning and cooling.

DETAILED DESCRIPTION OF THE PREFERRED EMBODIMENT

Figure 1:
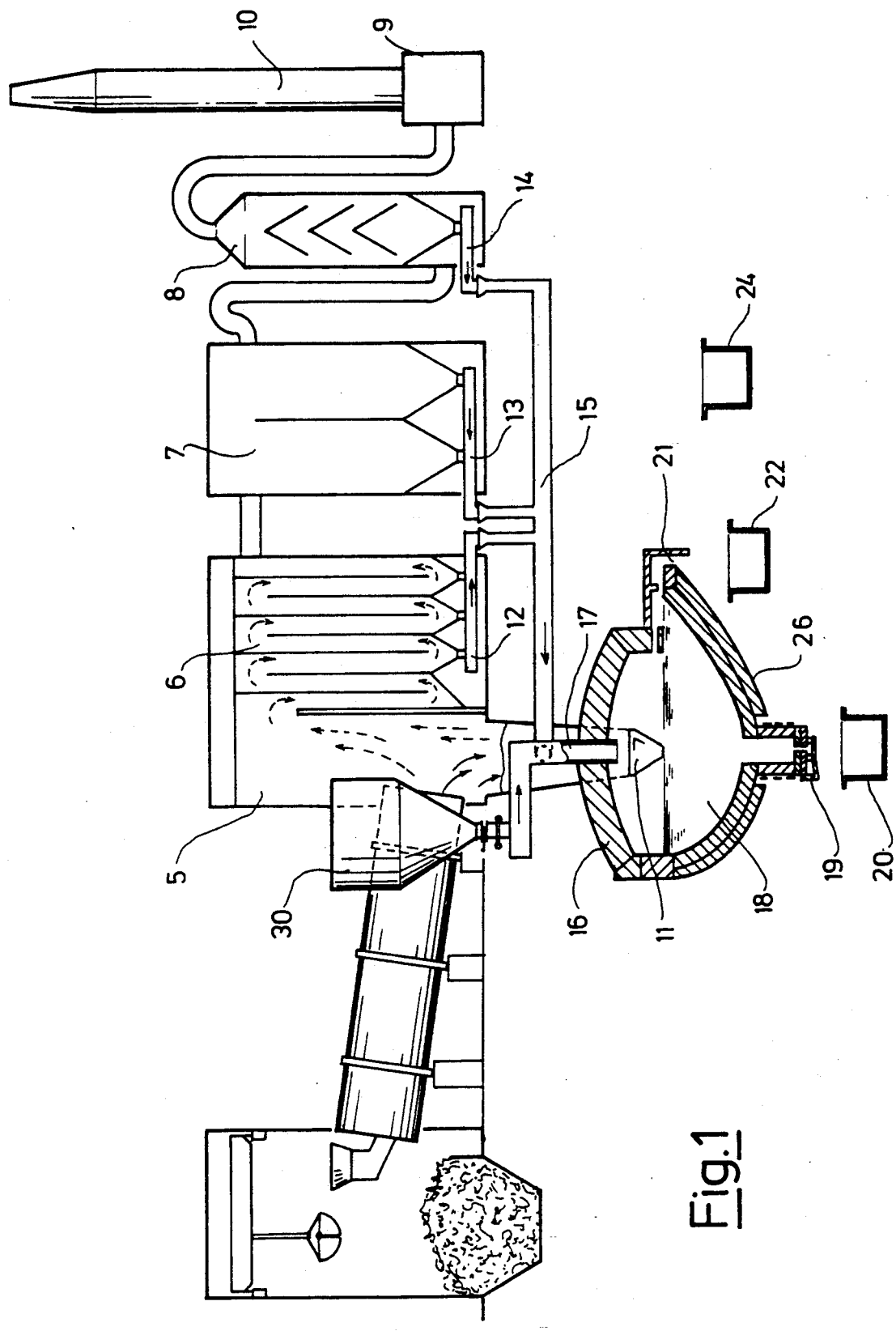
FIG. 1 is a diagrammatic longitudinal section through a special-class waste incinerator for the performance of the process of the invention with a bunker for the additives swung aside for clarity.
Figure 2:
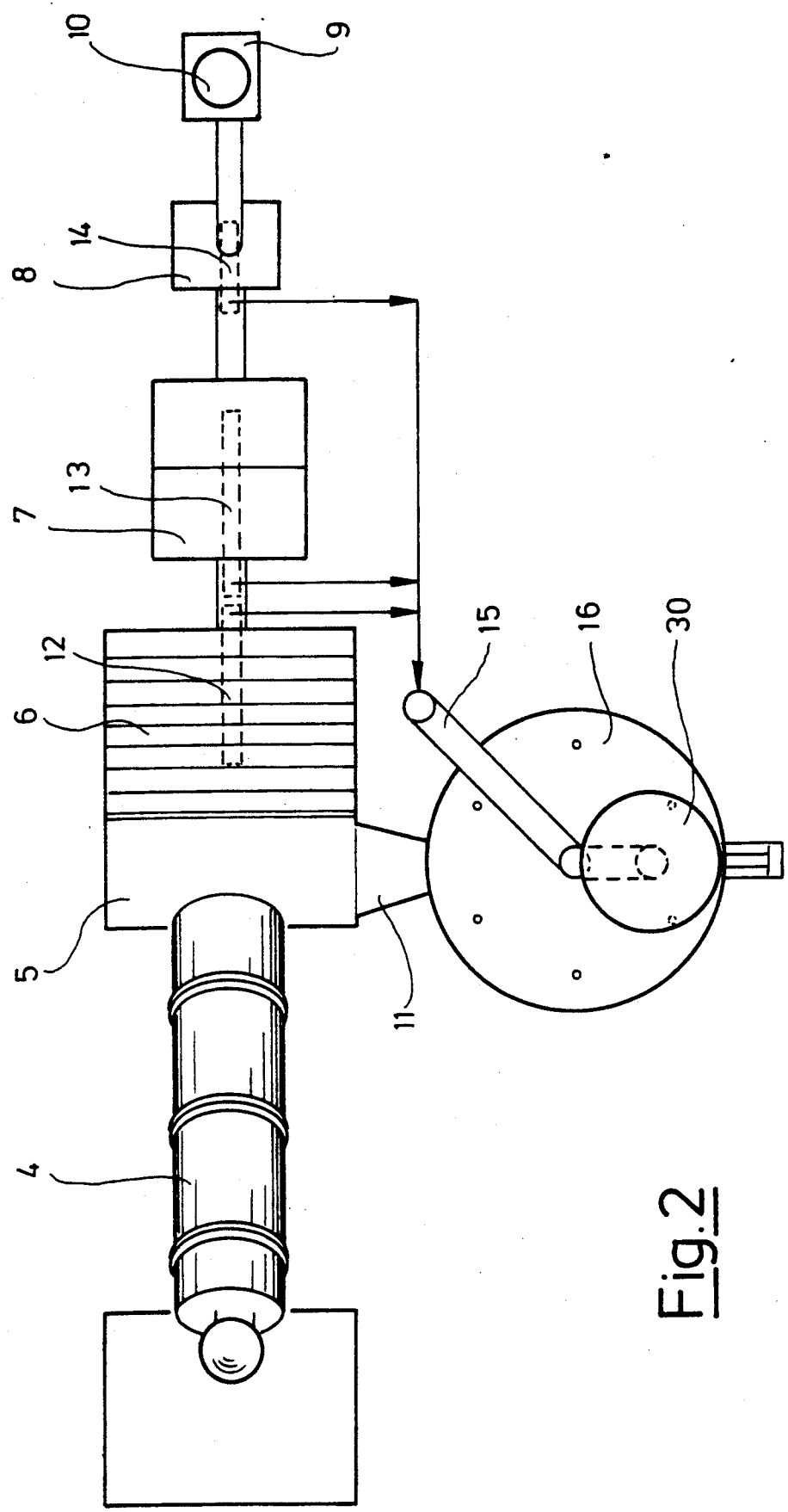
FIG. 2 is a plan view of this apparatus with melting furnace turned 90°.

The incinerator for special-class waste represented in FIG. 1 comprises as its core apparatus a rotary furnace 4, an afterburner 5, the waste-heat boiler 6 and the exhaust scrubbers 7 and 8 with updraft blower 9 and clean gas chimney 10.

For the after-treatment of solid residues and slags from the rotary furnace 4 as well as the ashes from the waste-heat boiler 6 and the filter dust from the scrubbers 7 and 8, which can also contain heavy metals, dioxins and furans as pollutants, a modified, electrically heated glass melting furnace 16 and 18 of otherwise conventional construction is installed at an angle below the afterburner 5.

For the delivery of the fluid slags and solid residues from the rotary furnace 4, a slag hopper 11 connects the upper part 16 to the afterburner 5. The delivery of the residue products from the waste-heat boiler 6, dust filter 7 and flue gas cleaner 8 is performed through the respective dust removal apparatus 12, 13 and 14, which apparatus supply dust to an apparatus 14 for feeding coarse and fine dusts 15. This feeder 15 is operated in such a manner that cold waste products from the dust removal apparatus are fed discontinuously according to the volume of slag and residues produced by the rotary furnace 4, and that through this feeder 15 additives, such as cullet for example, can be loaded in from a bunker 30, if necessary, to achieve a usable glass product.

The exhaust from the melting furnace is fed through the slag hopper 11 to the afterburner 5 and from there together with the exhaust from the rotary furnace 4 and cleaned and cooled in the exhaust gas scrubbers. The same is done with the exhausts from the pouring and overflow section 21, 23 of the glass melting furnace; the exhaust gases from this part of the furnace are gathered in at least one collector duct and fed into the slag hopper 11 or directly drawn off through the melting furnace.

The end products of the melting furnace 16, 18, are subjected to a (gravimetric) separation by gravity on the basis of their specific gravity.

In the bottom of the furnace body 18 is the tap 19 for heavy metals, the outlet 28 for the glass mass 21 is in the lateral tapping area, and the opening 23 for the glass gall. These openings for the different products are associated with the corresponding transporting vessels 20, 22 and 24.

Figure 3:
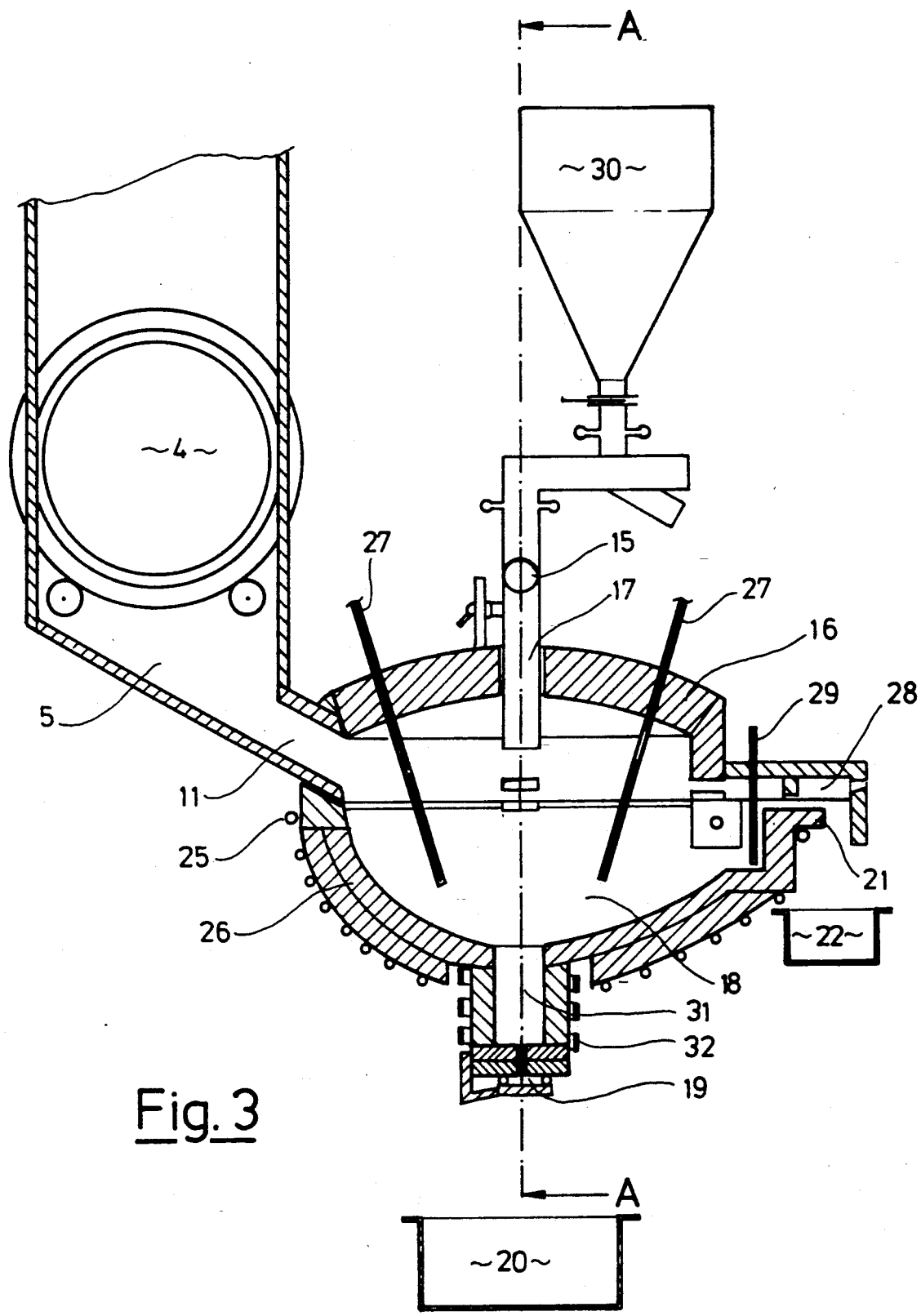
FIG. 3 is a cross section through the melting furnace according to FIG. 2 for performing the process.
Figure 4:
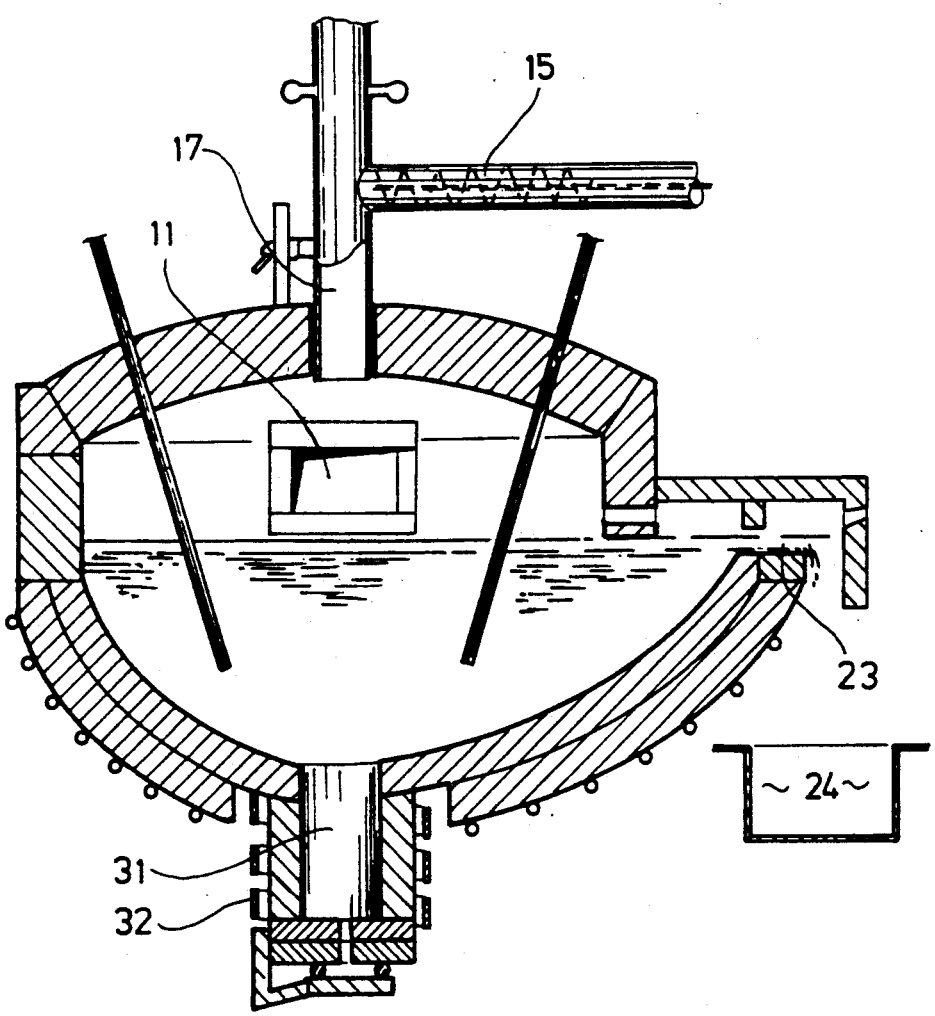
FIG. 4 is a cross section of the melting furnace in the position shown in FIG. 1.

Referring to FIG. 3, electrodes 27 are set at uniform intervals near the bottom of the furnace for the production of the necessary melting heat. At least one additional resistance electrode 29 is disposed at the outlet 21. Such electrodes are described in the patent literature. The settling chamber 31 and its inductive heater 32 permit the collection of the heavy metals at a desired temperature.

Between the furnace cover 16 and the oven bottom 18, additional liquid-cooled elements 25 are disposed, but the hearth of the glass melting furnace is lined with refractory materials 26.

The control, observation and regulation of the melting apparatus and its accessories, as well as automation of the after-treatment apparatus, can be included in the overall control system of the special-class waste incinerator and coupled by interfaces.

We claim:

1. Method for the environmentally compatible vitrification of solid and fluid residues from incinerating special class waste, comprising
    incinerating said special class waste in a rotary furnace so that a molten slag and an exhaust gas are produced,
    cleaning said exhaust gas to remove any residues from said exhaust gas,
    introducing said molten slag and said residues directly into a glass melting furnace,
    adding glass forming substances to said glass melting furnace, said substances comprising at least one of phonolite, $SiO_2$, and cullet, and
    vitrifying said substances, said slag and said residues in said glass melting furnace.

2. Method as in claim 1 wherein said glass melting furnace produces an exhaust gas, said method further comprising combining said exhaust gas from said glass melting furnace with said exhaust gas from said rotary furnace to produce a combined exhaust gas and cooling said combined gas prior to cleaning said exhaust gas.

3. Method as in claim 2 further comprising subjecting said combined exhaust gas to afterburning prior to cooling, said afterburning occurring at temperatures sufficient for the destruction of dioxins and furans.

4. Method as in claim 1 wherein a bath of molten glass having a surface layer of glass gall forms in the glass melting furnace, said method further comprising removing said molten glass and said glass gall from said glass melting furnace separately.

5. Method as in claim 4 wherein heavy metals collect in a lowest part of the furnace below the glass bath, said method further comprising removing said heavy metals from said glass melting furnace separately from said molten glass and said glass gall.

6. Method as in claim 1 wherein slag is removed from the rotary furnace under the influence of gravity.

7. Apparatus for the environmentally compatible vitrification of solid and fluid residues from incinerating special class waste, comprising
    a rotary furnace which incinerates said special class waste to produce a molten slag and an exhaust gas,
    an afterburning chamber connected to said rotary furnace for receiving said molten slag and said exhaust gas,
    an electrically heated glass melting furnace connected to said afterburning chamber for receiving said slag,
    cleaning apparatus for removing residues from said exhaust gas, and
    charging means for introducing said residues and glass forming additives to said glass melting furnace.

8. Apparatus as in claim 7 further comprising a slag hopper below said afterburning chamber for receiving said slag and feeling said slag to said glass melting furnace.

9. Apparatus as in claim 7 further comprising cooling means for said glass melting furnace.

10. Apparatus as in claim 7 further comprising
    withdrawal means for withdrawing heavy metal from a bottom portion of said glass melting furnace, and
    overflow means for withdrawing glass gall from a top portion of said glass melting furnace.

11. Apparatus as in claim 10 wherein said means for withdrawing heavy metal comprises a settling chamber and electrical heating means for maintaining heavy metals in said chamber at a desired temperature.

12. Apparatus as in claim 7 further comprising means for directly feeding exhaust gas from the glass melting furnace to the afterburning chamber.

13. Apparatus as in claim 8 further comprising
    a slag hopper below said afterburning chamber for receiving said slag and feeding said slag to said glass melting furnace,
    overflow means for withdrawing glass gall from a top portion of said glass melting furnace, and
    means for capturing exhaust gas from the overflow means and transferring said exhaust gases from the overflow means to said slag hopper, whereby said exhaust gas from said overflow means is fed to said afterburning chamber.

14. Apparatus as in claim 7 further comprising
    a setting chamber for collecting heavy metals in a bottom portion of said glass melting furnace, and
    an inductive heating coil about said settling chamber for maintaining said heavy metals in a fluid, mixed state.

* * * * *